(12) United States Patent
Dobusch et al.

(10) Patent No.: US 8,692,680 B2
(45) Date of Patent: *Apr. 8, 2014

(54) RESIDUAL-CURRENT CIRCUIT BREAKER

(75) Inventors: Gerhard Dobusch, Vienna (AT); Michael Bartonek, Vienna (AT)

(73) Assignee: Moeller Geräudeautomation GmbH, Schrems (AT)

( * ) Notice: Subject to any disclaimer, the term of this patent is extended or adjusted under 35 U.S.C. 154(b) by 1136 days.

This patent is subject to a terminal disclaimer.

(21) Appl. No.: 12/486,314

(22) Filed: Jun. 17, 2009

(65) Prior Publication Data

US 2009/0315732 A1 Dec. 24, 2009

Related U.S. Application Data

(60) Provisional application No. 61/073,529, filed on Jun. 18, 2008.

(30) Foreign Application Priority Data

Jun. 18, 2008 (AT) .................................. A 976/2008

(51) Int. Cl.
*G08B 21/00* (2006.01)

(52) U.S. Cl.
USPC ........... 340/638; 340/644; 340/646; 340/650; 340/660; 340/661; 340/662; 340/664

(58) Field of Classification Search
None
See application file for complete search history.

(56) References Cited

U.S. PATENT DOCUMENTS

2002/0085326 A1    7/2002    Kim et al.

FOREIGN PATENT DOCUMENTS

| DE | 4009094 A1 * | 5/1991 | ............... H02H 3/33 |
| DE | 197 23 130 A1 | 1/1999 | |
| DE | 299 02 776 U1 | 6/1999 | |
| DE | 199 40 343 A1 | 3/2001 | |
| EP | 0 905 847 A | 3/1999 | |
| EP | 902516 A2 * | 3/1999 | ............... H02H 3/33 |
| EP | 1 026 805 A | 8/2000 | |
| EP | 1026805 A2 * | 8/2000 | ............... H02J 3/33 |
| GB | 2 268 011 A | 12/1993 | |
| JP | 2003217433 A | 7/2003 | |

* cited by examiner

*Primary Examiner* — Julie Lieu
(74) *Attorney, Agent, or Firm* — Henry M Feiereisen LLC

(57) ABSTRACT

A residual-current circuit breaker includes at least one summation current transformer through which a first lead and a second lead of a network to be protected are guided. At least one secondary winding is arranged on the summation current transformer and operatively connected, at least indirectly, with an energy storage element. A trip element is operatively connected with break contacts in the first and second leads. In order to reduce expected cut-offs of a network to be protected, an electric signaling device is operatively connected, at least indirectly, with the energy storage element.

24 Claims, 1 Drawing Sheet

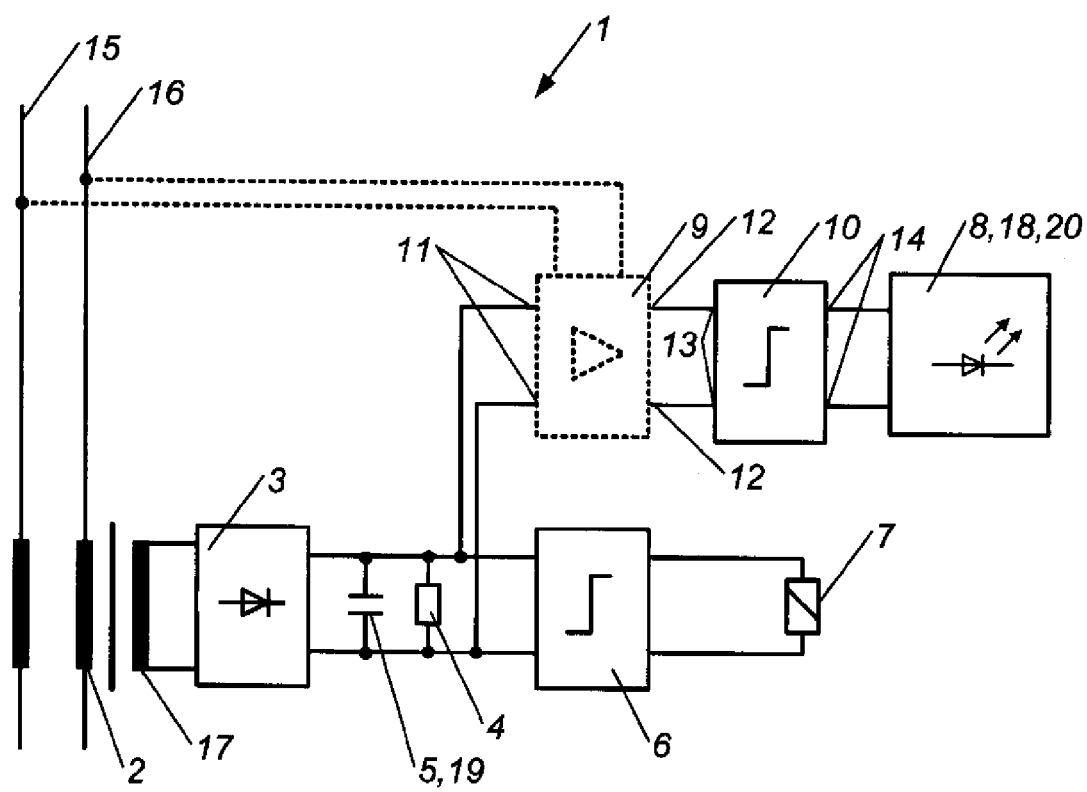

RESIDUAL-CURRENT CIRCUIT BREAKER

CROSS-REFERENCES TO RELATED APPLICATIONS

This application claims the benefit of prior filed U.S. provisional Application No. 61/073,529, filed Jun. 18, 2008, pursuant to 35 U.S.C. 119(e), the content of which is incorporated herein by reference in its entirety as if fully set forth herein.

This application also claims the priority of Austrian Patent Application, Serial No. A 976/2008, filed Jun. 18, 2008, pursuant to 35 U.S.C. 119(a)-(d)

BACKGROUND OF THE INVENTION

The present invention relates to a residual-current circuit breaker.

The following discussion of related art is provided to assist the reader in understanding the advantages of the invention, and is not to be construed as an admission that this related art is prior art to this invention.

Residual-current circuit breakers for the protection of humans and electrical installation arrangements from hazardous residual currents are known which cut off an electric network upon the occurrence of hazardous fault currents. The disadvantageous aspect is that such a cut-off of an electric network is mostly undesirable by the user or causes high costs in many cases, such as the supply and control of processes which must not be interrupted, the performance of complex technical processes or in the production of technical glasses in which controlled cooling periods in the magnitude of several months can be found. Any interruption of the power supply during such a process causes high costs and an irresponsible waste of raw materials. A further problem is especially the interruption of power supply in computer applications, which may lead to data loss up to an endangerment of human life.

It would therefore be desirable and advantageous to provide an improved residual-current circuit breaker to obviate prior art shortcomings and to reduce unexpected cut-offs of a network to be protected.

SUMMARY OF THE INVENTION

According to one aspect of the present invention, a residual-current circuit breaker includes a summation current transformer through which a first lead and a second lead of a network to be protected are guided, a secondary winding arranged on the summation current transformer, a energy storage element operatively connected, at least indirectly, to the secondary winding with, a trip element operatively connected with break contacts in the first and second leads, and an electric signaling device operatively connected, at least indirectly, with the energy storage element.

As a result of present invention dead times of machines can be reduced and incurred costs can be decreased. A user is thus informed about the current applied fault-current level and can optionally deactivate or separate electric consumers from the network himself in order to pre-empt a potential cut-off of a circuit by the residual-current circuit breaker. In this way it is especially possible to prevent data loss as a result of a cut-off of a network by the residual-current circuit breaker especially in the case of critical computer applications because data can be backed up in the case of an imminent fault current or devices that generate potential leakage currents can be deactivated.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a circuit diagram of a residual-current circuit breaker according to the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that elements are sometimes illustrated by graphic symbols, phantom lines, diagrammatic representations and fragmentary views. In certain instances, details which are not necessary for an understanding of the present invention or which render other details difficult to perceive may have been omitted.

Turning now to the FIGURE, there is shown a residual-current circuit breaker according to the present invention, generally designated by reference numeral 1. The residual-current circuit breaker 1 includes at least one summation current transformer 2 through which at least one first lead 15 and one second lead 16 of a network to be protected are guided. At least one secondary winding 17 is arranged on the summation current transformer 2 and operatively connected, at least indirectly, with at least one energy storage element 5. The residual-current circuit breaker 1 further includes a trip element 7 which is operatively connected with break contacts in the at least one first lead 15 and the at least one second lead 16, with at least one electric signaling device 20 being operatively connected, at least indirectly, with the energy storage element 5.

Dead times of machines can thus be reduced and incurred costs can be decreased. A user is thus informed about the current applied fault-current level at least in a qualitative respect and can optionally deactivate or separate electric consumers from the network himself in order to pre-empt a potential cut-off of a circuit by the residual-current circuit breaker 1. In this way it is especially possible to prevent data loss as a result of a cut-off of a network by the residual-current circuit breaker 1 especially in the case of critical computer applications because data can be backed up in the case of an imminent fault current or devices that generate potential leakage currents can be deactivated.

In the occurrence of a fault current which is not or not yet sufficiently large to cause a tripping of the residual-current circuit breaker 1, the signaling device 20 is activated, e.g. the electric luminous element 8 will light up and will thus signal the presence of a fault current. This allows the user to set steps prior to the tripping of the residual-current circuit breaker 1, such that devices are taken from the network and/or sensitive processes can be secured or terminated. Furthermore, the search for a fault is considerably simplified by a residual-current circuit breaker 1 in accordance with the invention because it can be recognized immediately after the activation of a device whether a fault current occurs.

The FIGURE shows a currently preferred embodiment of a residual-current circuit breaker 1 in accordance with the invention for fault-current tripping preferably independent of line voltage as a schematic illustration of the functional modules and the circuit connections. Such a residual-current circuit breaker 1 is provided for the protection of installations and humans, with the consumers connected to the residual-current circuit breaker 1 being separated from the supply network comprising the first lead 15 and the second lead 16 in the case of an occurring hazardous fault current. The residual-current circuit breaker 1 comprises terminals, especially screw terminals, for connecting at least one first and one second lead 15, 16 of an electric supply network. The illustrated schematic circuit diagram shows an embodiment with merely one first lead 15 and one second lead 16. It is possible to provide embodiments with any predeterminable number of lines or leads of an electric power supply network, especially embodiments with three or four leads, for the protection of a three phase load connected to the three-phase supply network. The further description relates to the illustrated embodiment with one first lead 15 and one second lead 16. This shall include embodiments with several leads in a respectively equivalent manner. So-called break contacts, and therefore switching contacts, are arranged in the first and second leads 15, 16 (not shown), which contacts are provided or arranged for breaking or interrupting the first and second leads 15, 16 and for subsequent closing. The components or modules described and/or shown in the drawing are jointly arranged in a housing made of insulating material which comprises breakthroughs at least for the terminals and a hand switch lever to be actuated manually for opening and closing the break contacts. It can further be provided that a residual-current circuit breaker 1 in accordance with the invention comprises further modules or components (not shown or described), such as a position indicating device, a tripping display unit and the like.

As already mentioned, a residual-current circuit breaker 1 in accordance with the invention is preferably arranged as a residual-current circuit breaker 1 which is independent of line voltage. The modules arranged in such a residual-current circuit breaker 1 which is independent of line voltage for detection of a fault current and for tripping the residual-current circuit breaker 1 and thus for disconnecting the break contacts gain their power necessary for tripping completely from the fault current or the fault-current signal proportional to the same in the secondary winding 17 and therefore do not comprise any power unit for the supply of active components.

A residual-current circuit breaker 1 in accordance with the invention includes at least one summation current transformer 2 with a transformer core, comprising a magnetic material through which the first and second leads 15, 16 are guided as a primary winding. It can be provided to guide the first and second leads 15, 16 merely through a substantially central opening of the summation current transformer 2 or to wind the same about the transformer core. A secondary winding 17 for the detection of a fault-current signal is further arranged on the summation current transformer 2, with the secondary winding 17 being connected through circuitry with at least one energy storage element 5 at least indirectly, and the energy storage element 5 being connected with a trip element 7 at least indirectly or cooperating with such a one, which is preferably arranged as a permanent-magnet tripping relay, which thus enables achieving an especially secure and rapid reaction of a residual-current circuit breaker 1. The trip element 7 acts mechanically, preferably via a breaker mechanism (not shown), on the break contacts. In the occurrence of a hazardous fault current, a respective fault-current signal is generated in the secondary winding 17 and the trip element 7 acts upon the break contacts which are opened and disconnect the first and second leads 15, 16.

As shown in the FIGURE, the residual-current circuit breaker 1 includes a rectifier circuit 3 which is connected to the secondary winding 17. Currently preferred is the configuration of the rectifier circuit 3 as a full-wave rectifier, especially as a bridge rectifier. The rectifier circuit 3 is interconnected with the energy storage element 5 which is implemented in the form of a capacitor 19, resulting in a simple configuration and rapid reaction of the energy storage element 5. A discharging resistor 4 is switched parallel to the energy storage element 5 in order to ensure a discharging of the energy storage element 5 after the occurrence of a fault current. As described above, the energy storage element 5 acts upon the trip element 7. Advantageously, the energy storage element 5 is operatively connected via a second threshold circuit 6 with the trip element 7, with the second threshold switch 6 predetermining the voltage threshold for tripping the trip element 7. A threshold switch can be realized by comprising a Zener diode.

Advantageously, the residual-current circuit breaker 1 further includes a test circuit for testing the proper functioning and operational reliability of the residual-current circuit breaker 1. The test circuit includes at least one test button and a test resistor, with a fault current being simulated by pressing the test button via the test resistor which causes the residual-current circuit breaker 1 to trip.

Residual-current circuit breakers 1 in accordance with the invention include at least one electric signaling device 20 which is operatively connected in an indirect manner with the energy storage element 5. The electric signaling device 20 is advantageously switched in parallel to the energy storage element 5 which is designed as a capacitor so that the voltage level applied to the energy storage element 5 is outputted or displayed at least in a qualitative respect by the electric signaling device 20.

The electric signaling device 20 can be realized in any suitable manner that generates and transmits a signal after receipt of a predeterminable electric current and/or voltage signal. Examples include a loudspeaker, signal buzzer, a mechanical signal generator such as a small flag, an externally arranged relay, a radio interface or the like. Currently preferred is an implementation of the electric signaling device 20 in the form of an optical electric signaling device, such as an electric luminous element 8.

Examples of a luminous element 8 may involve bulbs, gas-discharge lamps, LEDs 18 and/or LCD displays. Currently preferred is a construction of the electric luminous element 8 in the form of an LED 18 to thereby achieve a high luminous intensity and thus an intense signaling effect as well as low power consumption. In the non-limiting example of the FIGURE, there is provided only one signal luminous element 8 and merely the brightness, the luminous intensity and the magnitude of the emitted light current is a measure for the magnitude of the voltage applied to the energy storage element 5 and thus a measure for the magnitude of the fault current. Of course, any number of electric luminous elements 8 may be provided and triggered in such a way that the number of illuminated luminous elements 8 is a measure for the magnitude of the fault current. A linear scaling or the reproduction of a bit pattern may hereby be provided to enable a very fine representation of different values. It can also be provided to arrange a predetermined number of electric luminous elements 8 in the form of an alphanumeric display, with respective means for triggering such a display being provided. In all described configurations of the arrangement of electric luminous elements 8, each configuration of the electric luminous elements 8 as described above can be provided.

Depending on the available output of the provided summation current transformer 2, an amplification of the voltage of the energy storage element 5 may be advantageous. Currently preferred is the arrangement of an amplifier circuit 9 for amplifying the voltage of energy storage element 5. The power available for triggering the luminous element 8 can be increased by the amplifier circuit 9. The amplifier circuit 9 includes active amplifying components such as transistors, FET and/or bipolar and/or operational amplifiers for this purpose.

In order to provide the supply voltage for the active components, a power unit is provided which is advantageously integrated in the module of the amplifier circuit 9 and is interconnected with the first and second leads 15, 16 of the network to be protected and thus draws power for the operation of the amplifier circuit 9 directly from the network to be protected. The amplifier circuit 9 is shown in the FIGURE by a broken line, as are the conductive circuit connections to the first and second leads 15, 16. As an alternative, the amplifier circuit 9 may be connected via a circuitry with a network-independent power supply unit, such as a battery, so that the amplifier circuit 9 can be operated independently on line voltage. Thus a residual-current circuit breaker 1 can be formed which is independent of line voltage. The power supply unit which is independent of the network (not shown in the FIGURE) supplies the amplifier circuit 9 with electric power. The battery may be implemented as any kind of an electrical element for generating electric voltage in an electrochemical way, e.g. a storage battery or a Leclanchè cell. Currently preferred is the configuration of the battery as a storage battery.

Advantageously, both a power unit as well as a network-independent power supply unit in the form of e.g. a storage battery may be provided, with the amplifier circuit 9 being supplied with electric power from the network up to a predetermined voltage level in the network, while the storage battery is charged at the same time. When the voltage level falls below a predefined level in the network, the amplifier circuit 9 is supplied with electric power via the storage battery. In order to control the different types of power supply of the amplifier circuit 9 as described above, a voltage monitoring unit can be provided.

In the presence of an amplifier circuit, at least one amplifier input 11 of the amplifier circuit 9 is connected to the energy storage element 5 and at least one amplifier output 12 of the amplifier circuit 9 is operatively connected, at least indirectly, with the electric luminous element 8. Therefore the amplifier output 12 is either directly connected with the luminous element 8 by means of circuitry or via a further interposed module. Amplifier input 11 and amplifier output 12 relate hereby to all contacts or poles required for a functional amplifier input 11 and amplifier output 12. As shown in the FIGURE, the amplifier input 11 and amplifier output 12 have each two contacts or poles. The number of contacts and poles may, of course, be increased when processing more complex signals.

In order to enable a predeterminable control of the response of the luminous element 8, the at least one amplifier output 12 is interconnected with at least one threshold switching input 13 of a threshold circuit 10 and at least one threshold switching output 14 of the threshold circuit 10 is interconnected with the electric luminous element 8. The threshold circuit 10 can be constructed to permit a user to adjust the threshold value. As a result, a limit value for the activation of the signaling device 20 can be predetermined by a user.

Further embodiments in accordance with the invention merely have a part of the described features, with any combination of features being provided, especially also such of different described embodiments.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A residual-current circuit breaker, comprising:
   a summation current transformer through which a first lead and a second lead of a network to be protected are guided;
   a secondary winding arranged on the summation current transformer;
   an energy storage element operatively connected, at least indirectly, to the secondary winding;
   a trip element operatively connected with break contacts in the first and second leads;
   an electric signaling device operatively connected, at least indirectly, with the energy storage element; and
   an amplifier circuit having an amplifier input connected to the energy storage element and an amplifier output operatively connected, at least indirectly, with the electric signaling device.

2. The residual-current circuit breaker of claim 1, wherein the electric signaling device is an optical unit.

3. The residual-current circuit breaker of claim 1, wherein the optical unit is a luminous element.

4. The residual-current circuit breaker of claim 3, wherein the luminous element includes a LED.

5. The residual-current circuit breaker of claim 1, wherein the amplifier circuit is interconnected with the first and second leads.

6. The residual-current circuit breaker of claim 1, further comprising a threshold circuit having a threshold switching input interconnected with the amplifier output, and a threshold switching output interconnected with the electric signaling device.

7. The residual-current circuit breaker of claim 1, wherein the amplifier circuit is interconnected with a network-independent energy supply unit.

8. The residual-current circuit breaker of claim 7, wherein the network-independent energy supply unit is a battery.

9. The residual-current circuit breaker of claim 1, wherein the energy storage element is constructed in the form of a capacitor.

10. A residual-current circuit breaker, comprising:
    a summation current transformer through which a first lead and a second lead of a network to be protected are guided;
    a secondary winding arranged on the summation current transformer;
    an energy storage element operatively connected, at least indirectly, to the secondary winding;
    a trip element operatively connected with break contacts in the first and second leads;
    an electric signaling device operatively connected, at least indirectly, with the energy storage element; and
    a rectifier circuit constructed for connection to the secondary winding and for interconnection with the energy storage element.

11. The residual-current circuit breaker of claim 10, wherein the electric signaling device is an optical unit.

12. The residual-current circuit breaker of claim 10, wherein the optical unit is a luminous element.

13. The residual-current circuit breaker of claim 12, wherein the luminous element includes a LED.

14. The residual-current circuit breaker of claim 10, wherein the energy storage element is constructed in the form of a capacitor.

15. A residual-current circuit breaker, comprising:
- a summation current transformer through which a first lead and a second lead of a network to be protected are guided;
- a secondary winding arranged on the summation current transformer;
- an energy storage element operatively connected, at least indirectly, to the secondary winding;
- a trip element operatively connected with break contacts in the first and second leads;
- an electric signaling device operatively connected, at least indirectly, with the energy storage element; and
- a discharging resistor switched parallel to the energy storage element.

16. The residual-current circuit breaker of claim 15, wherein the electric signaling device is an optical unit.

17. The residual-current circuit breaker of claim 15, wherein the optical unit is a luminous element.

18. The residual-current circuit breaker of claim 17, wherein the luminous element includes a LED.

19. The residual-current circuit breaker of claim 15, wherein the energy storage element is constructed in the form of a capacitor.

20. A residual-current circuit breaker, comprising:
- a summation current transformer through which a first lead and a second lead of a network to be protected are guided;
- a secondary winding arranged on the summation current transformer;
- an enemy storage element operatively connected, at least indirectly, to the secondary winding;
- a trip element operatively connected with break contacts in the first and second leads; and
- an electric signaling device operatively connected, at least indirectly, with the enemy storage element,
- wherein the energy storage element is operatively connected with the trip element via a further threshold circuit.

21. The residual-current circuit breaker of claim 20, wherein the electric signaling device is an optical unit.

22. The residual-current circuit breaker of claim 20, wherein the optical unit is a luminous element.

23. The residual-current circuit breaker of claim 22, wherein the luminous element includes a LED.

24. The residual-current circuit breaker of claim 20, wherein the energy storage element is constructed in the form of a capacitor.

* * * * *